Aug. 4, 1964  S. G. KRAPF  3,143,413

CERAMIC MATERIALS AND METHODS FOR THEIR MANUFACTURE

Filed June 3, 1960

INVENTOR.
SIEGFRIED G. KRAPF

BY HIS ATTORNEYS.
HARRIS, KIECH, FOSTER & HARRIS 3,143,413
CERAMIC MATERIALS AND METHODS FOR
THEIR MANUFACTURE
Siegfried G. Krapf, 404 S. Peck Drive,
Beverly Hills, Calif.
Filed June 3, 1960, Ser. No. 33,866
12 Claims. (Cl. 75—201)

This invention has to do generally with advancements in the manufacture of highly refractory materials useable for any of various purposes such as furnace or heating chamber linings, nozzles, conduits, baffles, structural members, electrical and thermal insulators, containers and heating elements, which materials are exposed to extremely high temperature gases or other heated media, or to severe mechanical stress or chemical corrosion, and has for its general object to provide new refractory materials having physical and chemical stability and consequent resistance to deterioration over extended service, at temperatures well beyond the range at which other materials in a like category are serviceable.

More specifically, the invention relates to new methods and products in the ceramic field involving generally the conversion of metallic and metallic compound materials by heat, pressure, and direct or alternating electrical current energy, to an integrated mass having by virtue of the physical and chemical properties of its components, resistance to softening at temperatures in excess of 2000° C. and as high as 2700° C. These properties not only render the product useable to greater advantage and economy for known or ordinary purposes than refractory materials that have been available in the past, but also give rise to new uses of both the product, and the processes or equipment that are made possible and practicable because of the properties of the product.

A major ultimate objective in the making of ceramic refractory materials of integrated components is to employ components which, when bonded together under the conditions herein contemplated, will resist melting or softening, as well as chemical change and mechanical stress, at the working temperatures to which the material is subjected. A further object is to provide a material having a smooth, hard surface free of cracks, spalls and holes. The term "ceramic" is used herein in its broader sense to include metal-ceramic or cermet materials.

In attempting to achieve refractory materials capable of service at temperatures in, for example, the 1000° C. to 2000° C. range, one of the most common practices has been to make sintered materials by methods involving generally the heating of compressed powdered metallic compounds and, when making cermets, powdered metals, to cause incipient melting of one or more of the components and their consequent boundary fusion together into an integrated mass. Other practices have involved the use of a high melting temperature metal or metal compound with a lower melting metallic component which through incipient or full melting during heating of the mixture, forms a bonding medium between the high melting and more refractory component which itself may remain unaffected by the heating. Insofar as I am aware, it has not been possible to make refractory materials according to any such prior practices that will satisfactorily withstand in service temperatures as high as 2000° C. Even at temperatures approaching 1800° C., their service life is so short as to necessitate undesirable frequent and costly replacements. Practical examples are high temperature furnace lining refractories.

One reason for the deteriorating tendencies of the available refractory materials is that it has not been possible to convert all parts or components of the heat-formed mass to forms and chemical compositions which will resist melting or softening at the higher temperatures, for example, as the temperatures in service approach 2000° C. The process of the present invention is applicable to a wide range of materials which may be combined to produce the desired highly refractory product. The end product of the process is a ceramic, including borides, carbides, nitrides, silicides, oxides, sulfides, binary and higher order combinations thereof and metal-ceramic combinations thereof (usually referred to as cermets). Many of these refractory materials are described in books such as: "Refractory Hard Metals," P. Schwarzkopf et al., The Macmillan Company, New York (1953), and "High-Temperature Technology," I. E. Campbell, John Wiley & Sons, Inc., New York (1956).

In accordance with the present invention, there is provided a process of making high temperature resistant materials which comprises compressing in a mold chamber a uniform finely-divided particle mixture composed of a first high melting temperature component, a metallic second component, and a third component which is reactable with the second component at an elevated temperature in a self-sustaining exothermic reaction to form a high melting compound; passing electric current through the mixture while being compressed to heat the mixture to a temperature at which the exothermic reaction will occur; then further heating the mixture by continuing the electric current passage during the exothermic reaction while the mixture is being compressed, with the heating and reaction being carried out without interruption and with continuous application of pressure and being completed in a few minutes; and finally effecting cooling of the resulting integrated product. It should be noted that the process of the invention is also applicable to the production of materials having relatively low temperature resistance, the composition of the ultimate product being dependent on the choice of initial constituents.

The present invention further provides apparatus for producing refractory materials which comprises a mold including a first electrical conducting portion, a second electrical conducting portion and a third electrical insulating portion, said third portion separating said first and second portions, said portions being separable to permit insertion and removal of material into and from said mold; means for applying a compressive force to some of said portions of said mold; and means for applying an electrical potential across said first and second portions.

The present invention is predicated upon one major concept, that of forming refractory ceramic bodies by processes of electrically influenced chemical change, whereby components in an initial mixture of metal and metal compounds subjected to heating in compressed particle form, are converted to compounds which bond together and collectively exist in the final product in such physical and chemical form as to resist, and be capable of remaining in extended serviceable exposure to, temperatures well in excess of 2000° C. I have made refractory compositions in accordance with the invention that have remained physically stable and serviceable at temperatures as high as 2700° C.

The invention is further predicated upon the concept of arriving at a final thermally stable product by its formation under continuously applied high pressure from a starting mixture which preferably includes three types of components: the first component being relatively inert chemically and in the nature of a thermally stable filler or moderator; the second component being a metal which I preferably select from among those metals which form ceramics, such as oxides, carbides, nitrides, borides, silicides and sulfides; and the third component being reactable with the metal component in a self-sustaining exothermic reaction to form one or more of the desired refractory ceramic products. The first component is ordinarily selected to have a melting temperature of at least 1500° C. and preferably in excess of 2000° C. Similarly, the second and third components are ordinarily selected to form a resultant product having a melting temperature of at least 1500° C. and preferably in excess of 2000° C. The minimum temperature limit is determined by the intended use of the finished ceramic material.

The present materials are formed by a process which, in its thermal and chemical sequences as affected by pressure and electric current, distinguishes the invention from all prior practices known to me. As indicated, the process involves the heating of a compressed mass of the uniformly mixed starting components in finely-divided form, preferably under 20 mesh size and finer, and most desirably in particles within the 20 to 400 micron size range. The mixture is subjected to compression, using continuously maintained pressure of at least about one ton per square inch and preferably within the range of 2 to 15 tons per square inch, in a mold or pressure chamber, and while under compression is subjected to what may be regarded as three heating stages, during which electric current is passed through the mixture to effect and to electrically influence the reactions involved. Conductivity and uniformity of current flow and heat generation throughout the compressed mixture are promoted by the quantity, very small size and uniform distribution of the conductive metal particles. The metal particles in the mixture serve as electrical conductors and therefore are made small, preferably in the order of 325 mesh, so that the particles may be disposed around the larger particles of the first and third components and contact one another to provide continuous electrical paths through the mixture. Pressures in excess of 15 tons per square inch may be used; however, these higher pressures create problems in die construction and operation and are used only in special applications.

Within the first stage of the process, current flow through the mixture raises its temperature to that level at which the described exothermic reaction will occur, or start to occur. While subject to variation, depending upon the particular materials present in the mixture, the temperature rise in this initial heating stage, by virtue of the electrical energy input, ordinarily will be within the range of about from room temperature to 1200° C., and usualy in the order of 600–800° C. The electrical resistance of the mixture is a function of the applied pressure and therefore the amount of pressure used in any particular operation can be selected, in conjunction with other variables to be described which also affect the resistance of the mixture, to permit heating of the mixture by electrical means in a short interval of time to the temperature at which exothermic reaction will begin. Upon starting of the exothermic reaction, the mixture is further heated and its temperature raised, to usually within the range of about 1200° C. to 1800° C., by the supplemented chemical exothermic heating. The exothermic heating constitutes the second stage of the process. In the third stage, the mixture is maintained under pressure at the elevated temperature produced by the exothermic reaction. Preferably the temperature of the mixture is maintained at the high level by continued electrical heating, preferably being about 2000° C., and typically in the range of about 1800° C. to 2300° C. The mixture is maintained under pressure during the third stage during which the mixture solidifies resulting in a dense and homogeneous intercrystalline structure in the nature of a chemical compound rather than an agglomeration. Maintenance of the high temperature during the third stage substantially eliminates shrinking and cracking while an increase in the temperature produces a more dense and higher refractory product. The first, second and third stages follow one another without interruption and with continuous application of pressure and current. Upon discontinuance of the pressure, the product is given slow cooling and annealing over periods as long as two hours, depending upon the size or volume of the piece.

The invention is further characterized by the relatively short over-all time interval required for carrying out the process. Due to the reactivity of the components chemically affected, the reduction and final reactions may be caused to occur rapidly. And because of the limited high temperature resistance of most practicable mold materials, it is desirable to limit the heating to short duration. Accordingly, in practice, the second and third stages may be completed within not more than about 25 seconds and in the formation of smaller pieces, within about 5 seconds. The time required for larger pieces will be in the order of one to three minutes and is, of course, related to the volume of the piece. These time figures may also include the first heating stage, since, by virtue of the combination of nonconductive and conductive metal particles in the mixture, the mixture may be currentheated quickly up to the second or exothermic heating stage. After reaching its final high temperature, the product mass is quickly removed from the mold for controlled cooling in any suitable manner that will give a very slow temperature drop throughout the cooling stage.

In more specific reference to the three principal components of the mixture as mentioned in the foregoing, the first and inert or relatively inert component, which in some respects can be regarded as being in the nature of a filler or moderator, may be composed of any or mixtures of various oxides, carbides, nitrides, borides, sulfides, or silicides, preferably those having melting temperatures above 2000° C. so as to function as a refractory component. The oxides include $TiO_2$, $ZrO_2$, $ThO_2$, $MgO$, $BeO$, $CeO_2$, $Al_2O_3$ and $CaO$; the carbides include $TiC$, $ZrC$, $ThC_2$, $B_4C$, $WC$, $W_2C$ and $VC$; the nitrides include $TiN$, $ZrN$ and $BN$; the borides include $TiB_2$, $ZrB_2$, $HfB_2$ and $VB_2$; the sulfides include $MgS$, $TiS$, $HfS$, $ZrS$ and $ThS$; and the silicides include $TaSi_2$, $Ti_5Si_3$, $Zr_2Si$. Also, the first component may consist of or include one or more of carbon, boron and silicon.

Additionally, the first component of the mixture may include one or more high melting temperature metals, which may remain as such in the final product with relatively little chemical change, at least quantitatively considered with other similar metals that may be involved in reduction or oxidation reactions. Such metals include chromium, molybdenum, tungsten, titanium and zirconium. When such metals are used in the first or filler component, they serve as electrical conductors and provide for control of the resistance of the mixture. While the mixture resistance is not critical, it is preferably selected to produce the desired temperature rise in a short time with readily available power sources. While referred to above as an inert component, this term is used in a relative sense. Actually the first component may participate in the reaction to a limited degree, but never at the energy level of the exothermic reaction of the second and third components. Examples of such participation by the moderator or filler, resulting in binary and higher order systems (e.g., spinels) will be given below. The first component functions as a moderator to regulate the main or exothermic reaction temperature and speed, as a filler for the refractory product and also permits control of the conductivity of the mixture. The moderator component also substantially eliminates the hazards of handling relatively unstable materials which may be used as the second or third component in certain applications.

The second component includes metals or mixtures thereof which are reactive with the third component in a self-sustaining exothermic reaction to form a ceramic material. Suitable metals include magnesium, aluminum, zirconium, titanium and thorium.

The third component may be selected from any or mixtures of: metal anhydrides such as chromium, tungsten, molybdenum, boron or uranium anhydride; metal carbonyls such as chromium, tungsten or molybdenum carbonyl; metal cyanides such as calcium, nickel or iron cyanide; oxides of the metals of the transition elements of the fourth to sixth group of the periodic system and oxides of silicon, boron, thorium and uranium; carbon; silicon; and boron.

These various materials which may be used either singly or in combination as the third component have a number of common characteristics. On being heated, they will react with the second component in a self-sustaining exothermic reaction. An exothermic reaction will occur between two or more materials when the heat of formation of the resultants of the reaction is greater than the heats of formation of the initial constituents. Heats of formation are readily available in various textbooks. Also, the resultant of the reaction will be a ceramic refractory. The phrase "ceramic refractory" is used herein to specify a group of high-melting temperature, hard substances, some of which have metallic character, and which, on the basis of chemical composition, are inorganic compounds of the ceramic type. The ceramic refractories include: oxides, carbides, nitrides, silicides, borides and sulfides of the transition metals of the fourth to sixth groups of the periodic system and of thorium and uranium; oxides of aluminum and magnesium; cermets of the above; and binary and higher order combinations of the above. The carbides, nitrides, silicides, borides and sulfides and cermets and combinations thereof are known as "hard metals."

While the relative proportions and selections of the three components may vary depending upon the particular composition and properties desired in the final product, the proportions will, in general, fall within the range of up to 70 percent (by weight) of the first component, about 5 percent to 40 percent of the second metal component, and an amount of the third component to react substantially all of the second component. Actual mixtures may have a quantity of a third component material in excess of that which will react stoichiometrically with the second component present, with the excess functioning as a filler or first component. Also, mixtures may be used which have a quantity of a second component metal in excess of that which will react with the third component present. In such a mixture, this extra second component metal is functioning as a first component metal, previously described. A typical example would be a mixture with an excess of titanium or zirconium as a second component, resulting in a titanium or zirconium cermet.

The proportion of the first component is chosen so that the resulting mixture will have an electrical resistance which permits heating of the mixture by electrical means in a short interval of time to the temperature at which the exothermic reaction begins. This ignition temperature is easily determined by testing for any particular combination, if not readily available in handbooks. For example, mixtures using titanium as the second component will ingnite at temperatures in the order of 1200° C.; those using aluminum, magnesium or zirconium in the order of 600° C.; while other mixtures will ignite at lower temperatures. The ignition temperatures can be reduced by using conventional catalysts to activate the metals and reduce the temperature. For example, titanium and aluminum can be activated by addition of $Hg(CN)_2$ or $HgCl_2$ and magnesium by iodine. Catalyst in the amount of about one twenty-fifth of the weight of the metal is ordinarily used. The selection of the quantity of the first component also provides control of the rate of reaction of the second and third components. The resistance of the mixture and the reaction rate are also affected by the size of the particles in the mixture. Hence, both a suitable conductivity and reaction rate can be obtained by control of proportion and particle size.

The ratio of the heat of formation of the exothermic reaction ingredients to the total quantity of materials in the mixture provides a measure of the rate at which the reaction will occur. In general, a ratio greater than about $-0.5$ to $-0.8$, expressed in kcal./mole/mole, may lead to a violent reaction, and a ratio less than about $-0.3$ to $-0.1$ may not cause a temperature rise sufficient to produce the best quality material.

The process of the invention produces a reaction which forms a unitary and homogeneous end product. The initiation and completion of the reaction under pressure in a very short time results in a process of high thermal efficientcy with a high rate of heat release providing a substantially uniform high temperature throughout the mixture and a finished unit of uniform composition.

The reactions occurring during the process of the invention in general fall into one of three classes, indicated below as (1), (2) and (3), wherein the first, second and third components are represented by F (filler or moderator), M (metal) and T, respectively.

$$T+M+F \rightarrow TM+F+\text{heat} \quad (1)$$
$$T_1T_2+M+F \rightarrow T_1M+T_2+F+\text{heat} \quad (2)$$
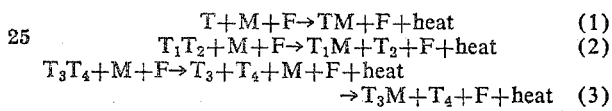
$$\rightarrow T_3M+T_4+F+\text{heat} \quad (3)$$

The reaction of Equation 3 is a two-step process wherein some heat is supplied by the decomposition of the third component and additional heat by the subsequent combination, since $T_3T_4$ is an endothermic compound. It should be noted that in each of Equations 1, 2 and 3 and in the following examples, the resultant product shown on the right of the equation is a single homogeneous product.

The following may be cited as typical examples of different components which, when subjected to heating and reaction in an electrical field under continuous pressure, result in the formation of bodies serviceable at extremely high temperatures. As previously indicated, the nature and end products of the reactions are governed both by chemical and electrical particle charge effects and relations. In these examples, the particle size of each component is sufficiently small to pass 60 mesh screen, and in each instance the components are uniformly mixed and heated under compression of about 5 tons per square inch.

*Example I*

A mixture composed of Mo, Mg, $Mo(CO)_6$, $TiO_2$ and carbon substantially in the proportions indicated by the left side of the reaction equation below initially is heated by alternating (60 cycle) current at sixty volts passing therethrough to about 1200° C., at which temperature exothermic reduction of the carbonyl occurs, producing a temperature rise to about 1700° C. to 1800° C., following which continued current flow in the mass raises its temperature to about 2200° C. In making a product the size of ordinary firebrick, the entire heating may occur in about 25 to 60 seconds. The reaction is believed to be substantially:

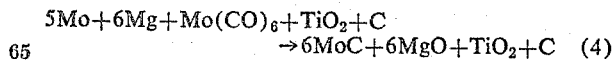
$$\rightarrow 6MoC+6MgO+TiO_2+C \quad (4)$$

In this mixture, the Mo, $TiO_2$ and C comprises the first component, the Mg, the second, and the $Mo(CO)_6$, the third. The molybdenum is added to provide a suitable initial resistance of about 0.1 ohm, and reacts with some of the carbon to a secondary degree as discussed above.

*Example II*

A mixture of Mo, Mg, $Mo(CO)_6$, TiC and C substantially in the proportions indicated by the left side of the reaction equation below is heated generally as in Example I, to effect the carbonyl reduction, oxidation and product formation in accordance with the following reaction:

$$10Mo + 6Mg + Mo(CO)_6 + TiC + C \rightarrow 5Mo + 6MoC + 6MgO + TiC + C \quad (5)$$

*Example III*

A mixture of $Ni(CN)_2$, B, Zr and TiN substantially in the proportions indicated by the left side of the reaction equation below is heated as before to produce a metallic nitride and carbide complex according to the equation:

$$Ni(CN)_2 + 2B + 2Zr + TiN \rightarrow Ni + 2Bn + TiN + 2ZrC \quad (6)$$

The following are additional examples of mixtures used in the process of the invention:

$$Ti + C + nTiC \rightarrow (n+1)TiC \quad (7)$$
(using $HgCl_2$ as a catalyst)

$$2Mg + TiO_2 + 2Si + nMgO \rightarrow TiSi_2 + (n+2)MgO \quad (8)$$
$$2Mg + TiO_2 + 2B + nMgO \rightarrow TiB_2 + (n+2)MgO \quad (9)$$
$$2Mg + SiO_2 + C + nMgO \rightarrow SiC + (n+2)MgO \quad (10)$$
$$2Mg + TiO_2 + nB \rightarrow 2MgO + Ti + nB$$
$$\rightarrow 2MgO + TiB_2 + (n-2)B \quad (11)$$
$$2Mg + C + TiO_2 + nMgO \rightarrow TiC + (n+2)MgO \quad (12)$$
$$2Mg + SiO_2 + C + nMgO \rightarrow SiC + (n+2)MgO \quad (13)$$
$$6Mg + TiO_2 + 2SiO_2 + nMgO \rightarrow TiSi_2 + (n+6)MgO \quad (14)$$
$$5Mg + TiO_2 + B_2O_3 + nTiB_2 \rightarrow (1+n)TiB_2 + 5MgO \quad (15)$$
$$3Mg + (m+1)Cr_2O_3 + nMgO \rightarrow 2Cr + (n+3)MgO + mCr_2O_3 \quad (16)$$
$$3Mg + 2CrO_3 + nMgO + mCr_2O_3 \rightarrow (m+1)Cr_2O_3 + (n+3)MgO \quad (17)$$
$$3Mg + 2CrO_3 + Cr_2O_3 + nMgO \rightarrow 2MgCr_2O_4 + (n+3)MgO \quad (18)$$
$$2Al + 3Mg + 2Cr_2O_3 + nMgO \rightarrow 4Cr + MgAl_2O_4 + (n+2)MgO \quad (19)$$
$$3MG + MoO_3 + 2Si + nMgO \rightarrow MoSi_2 + (n+3)MgO \quad (20)$$
$$5Mg + B_2O_3 + ZrO_2 + nMgO \rightarrow ZrB_2 + (n+5)MgO \quad (21)$$
$$4Al + 3U_3O_8 + nAl_2O_3 \rightarrow 9UO_2 + (n+2)Al_2O_3 \quad (22)$$
$$8Al + Al(NO_3)_3 + nAl_2O_3 \rightarrow 3AlN + (n+3)Al_2O_3 \quad (23)$$
$$5Al + 3Ti + Al(NO_3)_3 + nAl_2O_3 \rightarrow 3TiN + (n+3)Al_2O_3 \quad (24)$$
$$4Zr + 4Th + N_4S_4 + n(ZrN + ThS) \rightarrow (4+n)(ZrN + ThS) \quad (25)$$
$$4Zr + CN_4 + Va + nVaC \rightarrow 4ZrN + (n+1)VaC \quad (26)$$
$$5Zr + CN_4 + nZrC \rightarrow 4ZrN + (n+1)ZrC \quad (27)$$
$$3Mg + WO_3 + nMgO \rightarrow W + (n+3)MgO \quad (28)$$
$$3Th + 2WO_3 + nThO_2 \rightarrow 2W + (n+3)ThO_2 \quad (29)$$

The second, third and first components are set out in order in the left side of each of the preceding examples. The right side of the equations illustrate the variety of ceramic refractories and combinations thereof that are produced by the process of the invention, including a cermet (16), a binary oxide or spinel (17), a boride-oxide (15), an oxide-silicide (8), a nitride-sulfide (25) and an oxide-carbide (10).

Of course, the process of the invention is not restricted to any particular one or more of the reaction equations set out above, but is applicable to any three component mixture wherein the first component is a filler or moderator having a high melting point, the second component is a metal such as aluminum, magnesium, zirconium, titanium, and thorium, and the third component is a composition that will react with the second component in a self-sustaining exothermic reaction to form a ceramic refractory.

As to the temperature, the point in the heating at which exothermic reaction will occur may, of course, vary somewhat in accordance with the particular reactants involved. However, in all instances there will occur what may be regarded as three heating stages, in the first of which the temperature will be raised by current passage and resistance heating within the mixture, the second stage at which exothermic reaction occurs and continues through a further temperature rise ordinarily of several hundred degrees, and the third heating stage during which the temperature reached during the second stage is substantially maintained and preferably raised to the range of 2000° C. and above as by continued application of electric current. Either A.C. or D.C. electrical power may be used and the magnitudes of voltage and current are selected to produce the desired heating for the size and electrical resistance of the particular mixture being heated. In the examples given above with about one pound of mixture being heated, a power source providing approximately 60 volts A.C. at 60 cycles per second and 800 amperes, is utilized. When mixtures are used which provide no metal components in the end product, the applied voltage usually must be increased during the third stage because of the substantial increase in resistance of the material. As previously indicated, the conductivity of the mixture is also a function of the applied pressure, and the magnitude of pressure may be varied during the process to provide some current control. Even when no metals are present, there will be current conduction since oxides and similar compounds become semiconductors at elevated temperatures.

In each of the examples, the final product is subject to controlled slow cooling.

Further explanation of the process and suitable apparatus for practicing the invention will be given in the following detailed description of the accompanying drawing, in which.

Figure 1:
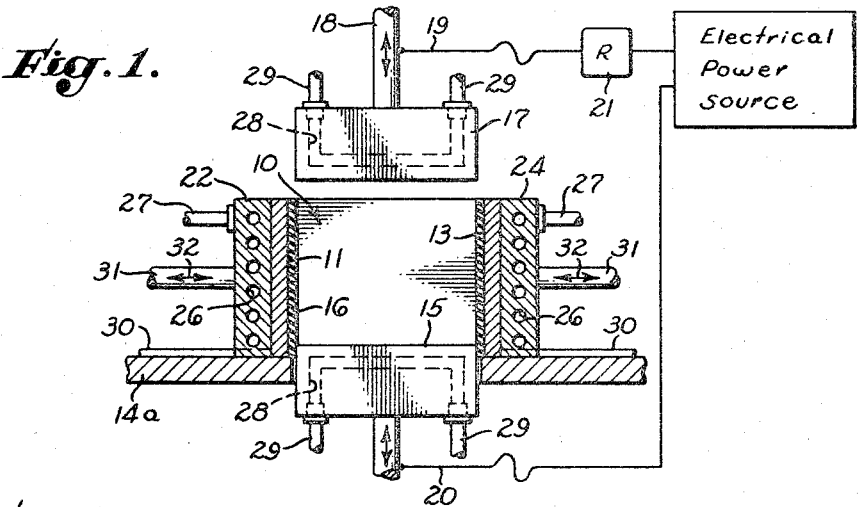
FIG. 1 is a view showing an illustrative mold assembly in vertical section.
Figure 2:
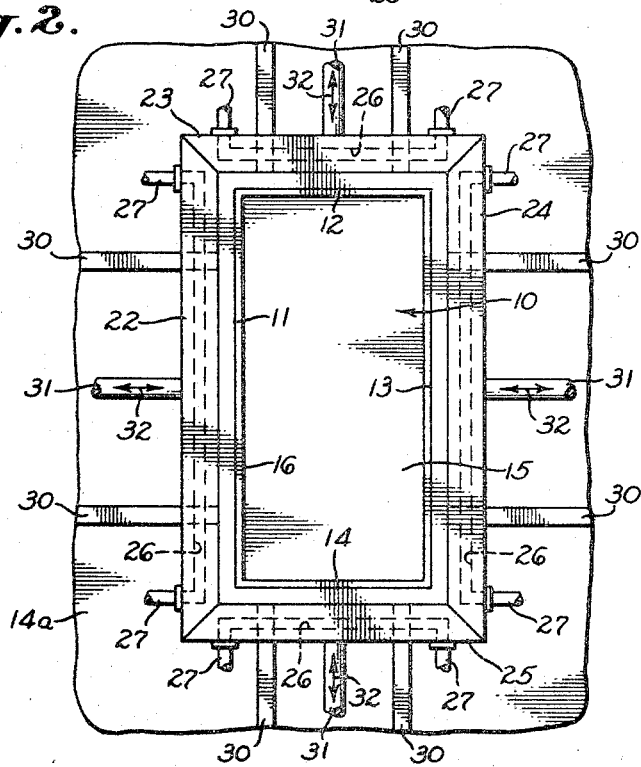
FIG. 2 is a plan view of FIG. 1.

Referring now to the drawing, the mold assembly comprises a chamber, generally indicated at 10, within which the uniformly admixed, finely-divided components discussed in the foregoing, are subjected to heating under compression, to form a product, the shape of which corresponds to the configuration of the chamber. Merely as illustrative, I have shown a mold chamber of generally rectangular cross-sectional shape, adapted for the formation of high temperature resistant bodies which may be used for and have the general shape and dimensions of furnace-lining refractory bricks. Accordingly, the mold chamber 10 is defined by the side walls 11, 12, 13 and 14 resting on a base 14a and a bottom removable plug or closure 15. These may be made of any suitable high melting material having sufficient strength to contain the mixture in the chamber 10 under the pressures to which it is subjected. In practice, I have used mold chambers in which the side walls 11 to 14 have been formed integrally of high melting temperature steel of nickel-chromium alloy composition. The bottom plug 15 is to be electrically conductive and may be made of steel. For confinement of current flow through the material in the chamber 10 between the plug 15 and the later described piston, the side walls preferably are lined with an electrically insulative material 16 which typically may be of a ceramic composition, and which may have the form of a coating on the chamber walls, or a container for the materials to be heated and which is inserted within the chamber.

The admixed components are subjected to high pressure by a steel piston or plunger 17, the rod 18 of which may be actuated by a power source, not shown, capable of subjecting the material in the chamber 10 to the high compression pressures mentioned herein above. Leads 19 and 20 from a suitable electrical power source are connected respectively to the piston or rod 17, 18, and to the bottom plug 15. A suitable rheostat or other appropriate control, generally indicated at 21, is placed in the electrical circuit to vary as desired the current flow through the mass being heated. In practice, I use low voltage current, e.g., 20 to 60 volts, at high amperage, typically within the range of 800 to 1200 amperes.

Because of the extremely high temperatures developed within the mixture in the chamber 10, it is desirable to provide for absorption of heat from the chamber walls and preferably also from the piston 17. For this purpose, I provide movable heat absorption or cooling elements, preferably in the form of conductive metallic blocks 22, 23, 24 and 25 engageable flatly against the surface of the side walls 11 to 14. Each block is provided with a suitable arrangement of passages 26 through which water or other cooling fluid is circulated by means of connecting lines 27. The piston 17 may be subjected to cooling by providing it with internal passages 28 through which cooling fluid is circulated by connecting lines 29. The bottom plug 15 may be cooled similarly. The side cooling elements or blocks 22 to 25 may be mechanically retractable from engagement with the chamber walls in any suitable manner as by molding the blocks for reciprocation within base guides 30 and by connecting to the blocks, rods 31 of double-acting pistons diagrammatically indicated at 32. It is preferred to heat all the interior faces of the chamber to about 600° C. immediately prior to placing a mixture therein in order to prevent surface cooling of the mixture during the initial resistive heating step. The use of a container for placing the mixture in the chamber provides thermal insulation for a short period and serves to prevent preignition of the mixture by the heated faces.

In carrying out the method as heretofore described, a uniform mixture of the three components is placed in the chamber 10 and subjected to high compression, say within the 2 to 15 tons per square inch range, with the cooling elements engaged against the chamber walls, and cooling fluid circulation is started therethrough as well as through the piston and plug, for continuance during the entire heating. The high amperage current is passed through the compressed mass to subject it to initial heating which occurs, of course, by reason of the combined conductive and resistance characteristics of the mixture, uniform conductivity through the mass being effected by reason of the uniform distribution and size of the metallic particles. The temperature of the mass may be brought quickly up to a temperature of say 600 to 1200° C., at which exothermic reaction of the second and third components will occur, the heating then continuing within what I have referred to as a second heating stage in which the temperature rise continues say within the range of 1200° C. to 1800° C. by the combined exothermic and continued electrical resistance heating. During the first and second stages, the third component is converted to one or more fluid constituents, gaseous or liquid, such as chromium, anhydride, carbon-monoxide or nitrogen, or sublimation of a component or constituent may occur, so that the fluidized material diffuses uniformly throughout the entire mass. Because of the high amperage current and high temperature of the mass, the diffused constituent of constituents are rendered highly reactive, and thus, we have created chemically a condition for the effective conversion of the second metallic component to one or more high melting temperature compounds; i.e., oxide, carbide or nitride, as a high temperature final product.

Such conversion, however, of the second or metallic component can be made to occur more completely and to best advantage in relation to the other components and desired properties of the final product, by continuing the temperature rise above the described second heating stage. Accordingly, the current flow through the mass is usually maintained or increased, depending on the resistance characteristics of the new products, to further elevate the temperature of the mass to a level that may range as high as 2300° C. and at which substantially complete reaction of the second or metallic component will occur.

The die may be operated in a vacuum to aid the escaped gases, such as water vapor and volatilized hydrocarbon, which may appear in the mixture as impurities. A vacuum in the range of one to one-tenth torr is suitable, where a torr is the pressure of one mm. of mercury on one square cm.

As previously indicated, the time required for the entire heating is brief and may range within an interval upwards to about three minutes depending upon the size of the mass in chamber 10. In the formation of a body of firebrick size, the first heating stage may occur within a period of 10 to 40 seconds, the second or exothermic stage heating in 5 to 10 seconds, and the final heating in 10 to 15 seconds. Because of the extremely high temperature to which the material has become heated, the integrated body is quickly removed from the mold at the conclusion of the heating, as by withdrawal of the plug 15, and the mass is allowed to slowly cool, say over a period of from 1 to 4 hours, for proper annealing and stress relieving. The resulting final product is a hard integrated mass characterized by its capacity to withstand in service in an atmosphere of air or ordinary combustion or furnace gases, temperatures that may range far above those temperatures at which the ordinary refractory materials are serviceable.

It should be noted that the process of the invention can be used to apply ceramic refractory coatings to metal plates and the like as has been done with previously known processes. The die may be charged with a lower layer of the desired mixture, the plate to be coated and an upper layer of the mixture. The process steps will be the same as in making the bricks described above, producing a sandwich-like product with outer coatings of ceramic refractory on opposing faces of the plate. Similarly, a brick having layers of different composition may be formed by charging the mold with different mixtures in layers. The process steps are the same as for a single mixture and the layer will be formed simultaneously and bonded together to form a single brick.

The existence and duration of each of the three stages may be observed by inserting a current meter in one of the leads coupling the electric power source to the mold. During the first stage, the meter will indicate a relatively steady current. Then there will be a period of oscillation of the indicated current which occurs during the exothermic or second heating stage. Following this, the current will again be relatively steady, although the magnitude may be different from the magnitude during the first stage because of change in resistance of the mixture. This stabilizing of the current indicates the end of the second stage and the applied voltage may then be adjusted to produce the desired current during the third stage.

This application is a continuation-in-part of my co-pending application entitled "Ceramic and Metal-Ceramic Materials and Methods for Their Manufacture," Serial No. 581,748, filed April 30, 1956.

I claim as my invention:

1. In a process for the manufacture of high temperature resistant materials, said process being of the type employing a uniform finely-divided particle mixture including a first filler component, a metallic second component, and a third component which is reactable with the second component at an elevated temperature in a self-sustaining exothermic reaction to form a ceramic refractory body and which mixture contains by weight up to about 70 percent of said first component, about 10 percent to 40 percent of said second component, and an amount of said third component to react substantially all of said second component, the improvement comprising:

applying a pressure of at least about one ton per square inch to the particle mixture;

passing electric current through the mixture while being compressed to heat the mixture to the elevated temperature at which said exothermic reaction will occur;

continuing said electric current passage during said exothermic reaction while the mixture is being compressed, with the heating and reaction being carried out without interruption and with continuous application of pressure and electric current; and finally effecting cooling of the resulting integrated product.

2. In a process for manufacturing high temperature resistant materials, said process being of the type employing a uniform finely-divided particle mixture which includes a first filler component, a metallic second component, and a third component which is reactable with the second component at an elevated temperature in the range of about 100–1200° C. in a self-sustaining exothermic reaction to form a ceramic refractory body and wherein the mixture contains by weight up to about 70 percent of the first component, about 10 percent to 40 percent of said second component, and an amount of the third component to react substantially all of said second component, the improvement comprising:

applying a pressure of at least about one ton per square inch to the finely-divided particle mixture;

passing electric current through the mixture while being compressed to heat the mixture to the elevated temperature at which said exothermic reaction will occur;

continuing said electric current passage during and following said exothermic reaction while the mixture is being compressed, to at least substantially maintain the temperature resulting from the exothermic heating, with the heating and reaction being carried out without interruption and with continuous application of pressure and electric current and being completed in a few minutes; and finally effecting cooling of the resulting integrated product.

3. In a process for manufacturing high temperature resistant materials utilizing a uniform finely-divided particle mixture including a first filler component, a metallic second component, and a third component which is reactable with the second component at an elevated temperature in a self-sustaining exothermic reaction to form a ceramic refractory body, said mixture containing by weight up to about 70 percent of said first component, about 10 percent to 40 percent of said second component, and an amount of said third component to react substantially all of said second component, the improvement comprising:

applying a pressure of at least about one ton per square inch to the particle mixture;

passing electric current through the mixture while being compressed to heat the mixture to the elevated temperature at which said exothermic reaction will occur;

continuing said electric current passage during and following said exothermic reaction while the mixture is being compressed, to heat the mixture to a temperature greater than that resulting from the exothermic heating, with the heating and reaction being carried out without interruption and with continuous application of pressure and electric current; and finally effecting cooling of the resulting integrated product.

4. In a method of manufacturing high temperature resistant materials utilizing a uniform finely-divided particle mixture including a first filler component, a metallic second component, and a third component which is reactable with the second component at an elevated temperature in a self-sustaining exothermic reaction to form a ceramic refractory body and wherein the mixture contains by weight up to about 70 percent of said first component, about 10 percent to 40 percent of said second component, and an amount of said third component to react substantially all of said second component, the improvement comprising:

including in the first component of the particle mixture an electrically conductive metal for control of the initial resistance to said mixture;

providing the particles of said mixture predominately within 20 to 400 micron size;

applying a pressure of at least about one ton per square inch to the particle mixture;

passing electric current through the mixture while being compressed to heat the mixture to the elevated temperature at which said exothermic reaction will occur;

continuing said electric current passage during said exothermic reaction while the mixture is being compressed, with the heating and reaction being carried out without interruption and with continuous application of pressure and electric current; and finally effecting cooling of the resulting integrated product.

5. The product made in accordance with the process of claim 1.

6. In a process of making high temperature resistant mtaerials, the steps of: compressing in a mold chamber a uniform finely-divided particle mixture composed of a first component having a melting temperature in excess of about 2000° C. and of the class consisting of metal oxides, metal carbides, metal nitrides and carbon, a second metal reducing component of the class consisting of zirconium, magnesium and aluminum, and a third component of the class consisting of the anhydrides of chromium, tungsten, molybdenum and boron and the carbonyls of chromium, tungsten and molybdenum and the cyanides of calcium, nickel and iron, said third component being chemically reducible by an exothermic reaction with said second component upon heating of the mixture to form a binder medium between particles of said first component, said mixture containing by weight about 20 percent to 70 percent of said first component, about 10 percent to 40 percent of said second component, and about 20 percent to 40 percent of said third component; passing electric current through the mixture under compression to initially heat the mixture to a temperature at which said exothermic reaction will occur producing additional heating of the mixture; then further heating the mixture under compression by current passage therethrough to at least substantially maintain the temperature resulting from the exothermic heating; and finally cooling the resulting integrated product.

7. The process as defined by claim 6, in which during the further heating following the exothermic reduction, the mixture is heated to a high temperature greater than the temperature resulting from the exothermic heating but less than the melting point of any of the components.

8. The process as defined by claim 7, in which said high temperature is in excess of 2000° C.

9. The process as defined by claim 6, in which electric current is passed through the mixture continuously during said initial, exothermic and further heating thereof.

10. The process as defined by claim 6, in which the duration of said exothermic and further heating of the mixture does not exceed about 25 seconds.

11. The process as defined by claim 6, in which the mixture being heated is continuously maintained under pressure of between about 2 to 15 tons per square inch.

12. The product made by the process of claim 6.

References Cited in the file of this patent

UNITED STATES PATENTS

| | | |
|---|---|---|
| 2,124,509 | McKenna | July 19, 1938 |
| 2,149,596 | Gillett et al. | Mar. 7, 1939 |
| 2,195,297 | Engle | Mar. 26, 1940 |
| 2,355,954 | Cremer | Aug. 15, 1944 |
| 2,393,130 | Toulmin | Jan. 15, 1946 |
| 2,491,410 | Laughlin et al. | Dec. 13, 1949 |
| 2,767,463 | Tacvorian | Oct. 23, 1956 |
| 2,777,162 | Banzhof | Jan. 15, 1957 |
| 2,791,804 | Talmage | May 14, 1957 |

FOREIGN PATENTS

| | | |
|---|---|---|
| 514,035 | Great Britain | Oct. 27, 1939 |
| 676,441 | Great Britain | July 30, 1952 |

UNITED STATES PATENT OFFICE
CERTIFICATE OF CORRECTION

Patent No. 3,143,413                                August 4, 1964

Siegfried G. Krapf

It is hereby certified that error appears in the above numbered patent requiring correction and that the said Letters Patent should read as corrected below.

Column 3, line 47, for "usualy" read -- usually --; column 5, lines 34 and 35, for "paritcular" read -- particular --; line 62, for "ingnite" read -- ignite --; column 6, line 16, for "efficientcy" read -- efficiency --; column 7, line 11, for that portion of equation (6) reading "+2Bn+" read -- +2BN+ --; column 9, line 49, for "of", second occurrence, read -- or --; column 12, line 15, for "mtaerials" read -- materials --.

Signed and sealed this 8th day of December 1964.

(SEAL)
Attest:

ERNEST W. SWIDER                              EDWARD J. BRENNER
Attesting Officer                                  Commissioner of Patents